United States Patent Office 3,729,556
Patented Apr. 24, 1973

3,729,556
PROPHYLACTIC PREPARATION FOR PREVENTING SENSITIZATION OF Rh-NEGATIVE MOTHERS BY Rh-POSITIVE FETAL ERYTHROCYTES
Otto Schwarz, 5 Celtesgasse, and Hans Eibl, 2 Gustav Tschermak-Gasse, both of Vienna, Austria
No Drawing. Filed Nov. 14, 1969, Ser. No. 876,994
Claims priority, application Austria, Apr. 29, 1969, A 4,134/69
Int. Cl. A61k 27/00
U.S. Cl. 424—177
4 Claims

ABSTRACT OF THE DISCLOSURE

The invention relates to a method for the production of a prophylactic preparation to prevent sensitization of Rh-negative mothers by Rh-positive fetal erythrocytes, in which a $Rh_o(D)$-immune globulin solution is mixed with a human albumin solution at a volume ratio of $Rh_o(D)$-immune globulin: albumin of between 1:2 and 1:10. The resulting preparation may be stored for a considerably prolonged period and may itself be utilized for an initial compatibility test by the agglutination method.

---

The invention relates to a method for the production of a prophylactic preparation which is of high value in obstetrics to prevent sensitization of Rh-negative mothers by Rh-positive fetal erythrocytes.

After the first works of Finn, R.; Clarke, C. A.; Donohoe, W. T. A.; McConnell, R. B.; Sheppard, P. M.; Lehane, D.; Kilke, W.: Experimental Studies Brit. Med. J. 1:1486–90, 1961 $Rh_o(D)$-immune globulin (human) has increasingly been used to prevent sensitization of Rh-negative mothers by fetal Rh-positive erythrocytes. The effect of the preparation is based on the $Rh_o(D)$-antibodies which are present in the $Rh_o(D)$-immune globulin in a sufficient concentration. The World Health Organization has already published appropriate recommendations with regard to the content of micrograms of $Rh_o(D)$-antibodies. (Editorial: The Suppression of Rh Immunization by Passively Administered Human Immunoglogulin (IgG) Anti-D (Anti-$Rh_o$.) Bulletin of World Health Organization. 36:467–74, 1967.

$Rh_o(D)$-immune globulin may be obtained from human plasma or serum containing $Rh_o(D)$-antibodies by cold ethanol fractionation.

Immunglobulins are classified as IgG, IgA, IgM, IgD and IgE. $Rh_o(D)$-immune globulin consists of at least 95% IgG.

Certain difficulties, which arose in the use of $Rh_o(D)$-immune globulin are due to the fact that the stability of the product is of short duration so that finished preparations have to be used within half a year, see Tentative Technical Standards of the National Institutes of Health of Dec. 29, 1967. Therefore, attempts have been made to extend the dating period of $Rh_o(D)$-immune globulin preparations with the aid of a stabilizer which is not antigenic for man and which is free from infectious agents. Another requirement which should be fulfilled is that it should afford the possibility to detect Rh-positive patients so as to avoid administration of this preparation to them. Until now a serological agglutination method with an anti-$Rh_o(D)$ test serum has been employed for this purpose which had to be separately obtained by the physician in charge or which was added to the package of $Rh_o(D)$-immune globulin in combination packs.

The above-mentioned invention permits to use such a preparation as a reagent as well as for the detection of $Rh_o(D)$-factor in maternal blood prior to its application as a safety measure.

These aims of the invention are achieved in that a $Rh_o(D)$-immune globulin solution is mixed with a human albumin solution at a volume ratio of $Rh_o(D)$-immune globulin: albumin of between 1:2 and 1:10.

Suitably human albumin is used as a 15–30% solution, preferably as a 20% solution.

Preferably the $Rh_o(D)$-immune globulin solution is used as a 1–25% solution, preferably as a 16% solution.

The content of active agents in the mixture is so adjusted that the mixture contains at least 100, preferably at least 250 µg. $Rh_o(D)$-immune globulin per ml., ascertained by the radio-immunological method developed by Erna Rochna and N. C. Hughes-Jones: The Use of Purified $^{125}$I-Labelled Anti-γ-Globulin in the Determination of the Number of D Antigen Sites on Red Cells of Different Phenotypes, Experimental Haematology Research Unit, Wright-Fleming Institute, St. Mary's Hospital, London. Vox. Sang. 10:675–686 (1965).

The human albumin solution which is added contains as stabilizer 0.02 mol. acetyl tryptophanate, and
0.02 mol. sodium caprylate and is heated for 10 hours at 60° C. in order to inactivate the virus of the homologous serum hepatitis.

The preparation produced by the method according to the invention is administered to $Rh_o(D)$-negative mothers not later than 72 hours post partum or post abortum to prevent sensitization by $Rh_o(D)$-positive fetal erythrocytes entering the blood circulation of the mother. In order to avoid injection of $Rh_o(D)$-immune globulin to $Rh_o(D)$-positive mothers (in such a case the $Rh_o(D)$-positive erythrocytes of the mother could be damaged by the injected $Rh_o(D)$-immune globulin) it is indicated to ascertain the compatibility of the preparation prior to the injection of $Rh_o(D)$-immune globulin. Such determination may be carried out by means of a "cross match," in which one drop of the maternal blood is mixed with one drop of $Rh_o(D)$-immune globulin on a slide. The drop of $Rh_o(D)$-immune globulin may be taken from the bottle prepared for the injection by means of the syringe. If the maternal blood has $Rh_o(D)$-positive properties, agglutination will occur. The presence of albumin is essential for the agglutination to occur.

All $Rh_o(D)$-immune globulin preparations which are commercially available so far may be stored only for several months because of the lability of $Rh_o(D)$-antibodies. The mixture produced by the method according to the invention may be stored for two years without loss in antibodies due to the stabilizing effect of albumin.

EXAMPLE

A human $Rh_o(D)$–IgG immune globulin fraction produced from human immune $Rh_o(D)$ plasma according to the alcohol fractionation method developed by Cohn, see E. L. Cohn et al., J. A. Chemical Society, vol. 68, page 459, 1946, or J. L. Oncley et al., J. A. Chemical Society, vol. 71, page 541, 1949, is dissolved from its freeze-dried condition with pyrogen-free distilled water to obtain a 16 gram percent protein solution. 2.25% glycine and 0.3% sodium chloride and Merthiolate are added in a concentration of 1:10,000 at pH=7.0. The solution so obtained is adjusted with a 16% solution of serum immune globulin (produced from a pool of at least 5,000 donors) in a ratio that the (D) immune globulin content amounts to 1,000 µg./ml. This adjustment has the purpose of avoiding with certainty the risk of any infection with serum hepatitis. The immune serum globulin is likewise yielded by the cold ethanol fractionation (method according to Cohn) and dissolved together with 2.25% glycine, 0.3% sodium chloride and Merthiolate in a concentration of 1:10,000, pH is adjusted to 7.0. The mixture is clarified and then sterilized by Seitz EKS II-filter pads. The content of $Rh_o(D)$-immune globulin in this solution is determined by means of the radio-immunological method developed by Hughes-Jones et al. When the result is known this solution is diluted under sterile conditions with a 20% human albumin solution of the following composition: 97% electrophoretically pure albumin; 0.02 mol. dl-N-acetyltryptophane-sodium and 0.02 mol. sodium caprylate and pH adjusted to 7.0, then the solution is filtered under sterile conditions whereupon it is heated at 60° C. in a water bath for 10 hours in order to inactivate the virus of the homologous serum hepatitis.

What we claim is:

1. A prophylactic preparation for preventing sensitization of Rh-negative mothers by Rh-positive fetal erythrocytes consisting essentially of a mixture of a 1 to 25% solution of $Rh_o(D)$-immune globulin and a 15 to 30% solution of human albumin in a volume ratio of $Rh_o(D)$-immune globulin solution to human albumin solution of 1:2 to 1:10.

2. The prophylactic preparation of claim 1 wherein the $Rh_o(D)$-immune globulin solution is a 16% solution and the human albumin solution is a 20% solution.

3. The prophylactic preparation of claim 1 wherein the mixture contains at least 100 μg. $Rh_o(D)$-immune globulin per milliliter, as determined according to the radio-immunological method developed by Hughes-Jones.

4. The prophylactic preparation of claim 3 wherein the mixture contains 250 μg. $Rh_o(D)$-immune globulin per milliliter.

References Cited

UNITED STATES PATENTS

| | | | |
|---|---|---|---|
| 3,449,314 | 6/1969 | Pollack | 424—85 |
| 3,579,627 | 5/1971 | Hayakawa | 424—11 |

OTHER REFERENCES

Chemical Abstracts, vol. 63, entry 11906a, 1965.
Scheiffarth et al.: Z. Naturforsch., vol. 16b, pp. 186–196, 1961.

RICHARD L. HUFF, Primary Examiner

U.S. Cl. X.R.

424—85